United States Patent [19]
Treutner et al.

[11] Patent No.: US 6,209,818 B1
[45] Date of Patent: Apr. 3, 2001

(54) COMPACT RIDER ROLL WHEEL

(76) Inventors: Jürgen Treutner, Elsterweg 17, 7302 Ostfildern 3; G. Walter Dörfel, Beethovenstrasse 21, 7325 Boll, both of (DE)

( * ) Notice: Subject to any disclaimer, the term of this patent is extended or adjusted under 35 U.S.C. 154(b) by 0 days.

(21) Appl. No.: 09/230,375

(22) PCT Filed: Aug. 5, 1997

(86) PCT No.: PCT/EP97/04250

§ 371 Date: Jan. 25, 1999

§ 102(e) Date: Jan. 25, 1999

(87) PCT Pub. No.: WO98/05579

PCT Pub. Date: Feb. 12, 1998

(30) Foreign Application Priority Data

Aug. 5, 1996 (DE) .......................................... 296 13 554 U

(51) Int. Cl.[7] .................................................. B65H 18/26
(52) U.S. Cl. .................. 242/547; 242/541.6; 242/541.7; 242/542.4
(58) Field of Search ............................... 242/547, 542.4, 242/541.7, 541.6

(56) References Cited

U.S. PATENT DOCUMENTS

| 3,389,450 | 6/1968 | Robertson . | |
|---|---|---|---|
| 3,944,150 | * 3/1976 | Jennerjahn | 242/541.6 X |
| 4,095,755 | * 6/1978 | Snygg et al. | 242/541.6 |
| 4,227,658 | * 10/1980 | Justus | 242/541.6 |
| 4,434,949 | * 3/1984 | Karr | 242/541.6 |
| 5,320,299 | 6/1994 | Fitzpatrick et al. . | |
| 5,632,456 | * 5/1997 | Kruger | 242/541.6 X |
| 5,806,783 | * 9/1998 | Turunen | 242/547 X |

FOREIGN PATENT DOCUMENTS

| 357 861 | 2/1977 | (AT) . | |
|---|---|---|---|
| 36 25 802 C2 | 7/1986 | (DE) . | |
| 295 07 313 U1 | 5/1995 | (DE) . | |
| 63-258350 | * 10/1988 | (JP) | 242/542.4 |
| 2-144359 | * 6/1990 | (JP) | 242/541.6 |

* cited by examiner

*Primary Examiner*—Donald P. Walsh
*Assistant Examiner*—Minh-Chau Pham

(57) ABSTRACT

A rider roll arrangement adapted for use in a web winding device including at least one winding supported during winding, the rider roll arrangement including a rider roll for pressing against the one winding, the rider roll comprising a support beam and a plurality of weighting rollers mounted to the support beam. Each pair of the weighting rollers includes a bracket for mounting the roller on the support beam, and each weighting roller includes two end to end cylinder piston units that are connected to the bracket and that are located entirely within the respective roller.

14 Claims, 2 Drawing Sheets

COMPACT RIDER ROLL WHEEL

Figure 1:
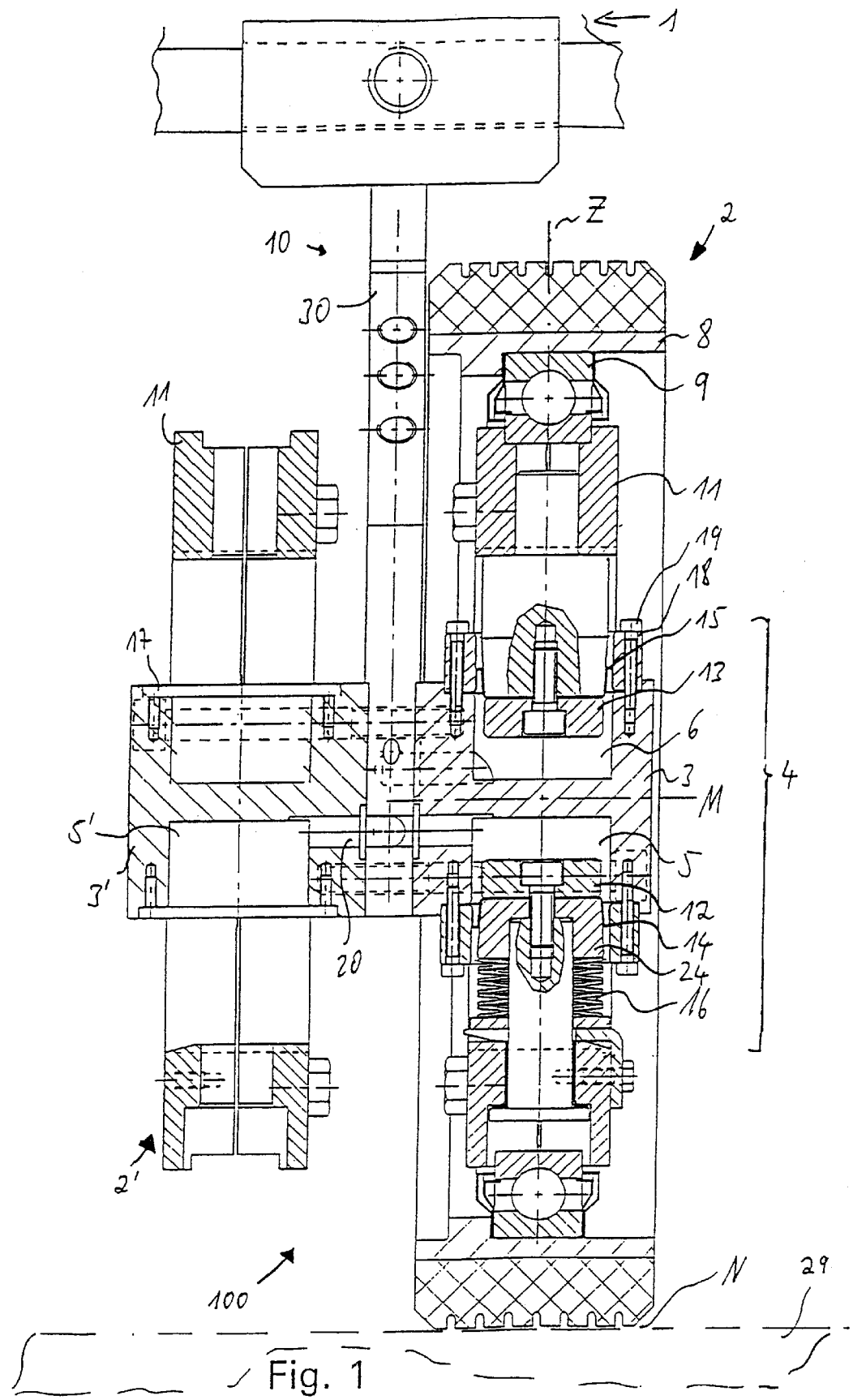

The invention pertains to a rider roll arrangement, to weight at least one winding of a material in the form of a web which is supported during winding in a winding device.

A rider roll arrangement of the same generic class is known from U.S. Pat. No. 5,320,299. In order to be able to hold the individual weighting rollers in contact with the winding along a line of contact (nip line), the brackets are mounted to the support beam in an articulated manner, such that the weighting rollers can be swung, independently of each other, about a pivot axis with respect to the support beam. A swinging of the weighting rollers on their brackets is carried out by means of one piston rod respectively, each end of which is applied with pressure by means of piston/cylinder units; the center regions of the piston rods feature a hinge for a pivoted connection with the associated brackets. A clear improvement of the winding structure was achieved with the known rider roll arrangements. However, due to the piston rod, the piston/cylinder units acting upon its two ends must be in extraordinarily precise alignment with each other. In addition, the bracket associated with each weighting roll transfers lateral force to the piston rod as it swings about the pivot axis.

Further the U.S. Pat. No. 3,389,450 discloses a roll comprising a support and a sleeve rotatable thereon, having means for removing transverse deflection or sag. A series of annular spools, including at least a pair of end spools, are rotatable mounted on the axis by a series of antifriction bearings, each spool being supported at either end by one of these bearings. Each of the intermediate bearings is radially adjustable on the axis by means of four support shoes arranged in pairs, which arcuately engage the inner circumference of the bearing. Each shoe is connected with one of corresponding hydraulic pistons, to adjust the position of the support bearing in this direction. The pistons are arranged for movement along a perpendicular axis radial to the support, to adjust the shoes to compensate for the change of internal dimension of the bearing along this axis as the bearing is shifted along the first axis. The pistons are supplied by fluid pressure at independently-controlled levels, wherein cylinders of corresponding orientation in each of their supports are connected in common, so that an equal adjustment of two bearings being symmetrically spaced with respect to the axial center of the axis is maintained. To adjust the pressure in each of the supply lines bellows are included which volumes are adjustable by means of screws. To adjust the entire roll with the series of annular spools the bellows and the corresponding cylinders are adjusted to straighten the roll.

The object of the invention is to create a compact rider roll arrangement, with which the space required for installation of the rider roll arrangement can be reduced. An additional object is to create a rider roll arrangement that enables a rapid and simple exchange of the weighting rollers for repair or maintenance work. Yet another object of the invention is to be able to select the number of weighting rollers per meter of rider roll width to be as high as possible.

In order to solve these problems, a rider roll arrangement is proposed. Due to a combination of the means for the pressing and lifting respectively of each individual weighting roller in a piston/cylinder unit that acts in two directions and due to the arrangement of this unit in the interior of the weighting roller, the building space required for each weighting roller with respect to the rider roll width is minimal. For this purpose, it is preferable to use pistons and cylinders that are separate from each other. Since a swinging of the weighting rollers with respect to the support beam can be omitted on one hand and since, on the other hand, a piston rod that is put under load on both sides can be omitted, it is especially simple to exchange the weighting rollers by means of detaching the brackets from the support beam.

The combination of hydraulic means and/or pneumatic means in a common piston/cylinder unit enables a precise variation of the nip pressure between the relevant weighting rollers and the winding that is weighted by means of said weighting roller, since slight differences in force between the pressing force and the lifting or compensating force acting in the opposite direction lead to a significant variation in nip pressure.

In a preferred embodiment, the cylinder comprises opposing cylinder chambers, with the hydraulic means acting upon the cylinder chambers that faces the at least one winding and the pneumatic means acting upon the opposite cylinder chamber, which faces away from the winding. This solution can be achieved in a preferred way with a cylinder having an H-shaped cross-sectional profile.

It is preferred for the brackets to comprise a central plate, to which the weighting rollers are mounted in pairs. With this arrangement, the number of weighting rollers per meter of rider roll width can be further increased and, simultaneously, two weighting rollers are exchanged in one step. A very simple mounting of the weighting rollers to the brackets can be achieved by means of mounting the cylinders in a fixed manner to the associated brackets. In particular, this mounting can be selected to be, in fact, fixed but in a detachable manner, e.g., by means of a screw connection, such that when exchanging a weighting roller, in particular with a paired arrangement, the other respective weighting roller can continue to be used.

In order to control nip pressure, it is advantegous that the cylinder chambers for the hydraulic means of the weighting rollers arranged in pairs are connected to each other and only the pneumatic means are controlled individually. By this means it is also possible to completely lift away weighting rollers that are not required, as is the case when winding several windings in the winding device, in the gap between windings, without the need to undertake structural modifications to the rider roll arrangement.

Additional practical configurations of the object of the invention are contained in additional claims. Details, features and advantages of the object are yielded from the following description with reference to the figure, in which is represented—per example—a preferred embodiment of a rider roll arrangement in accordance with the invention. The figures show:

FIG. 1: A sectional view of a bracket with weighting rollers arranged in pairs (section along line I—I in accordance with FIG. 2)—partially broken; and FIG. 2: A view of the bracket together with the weighting roller of FIG. 1 from the right (partially broken).

The rider roll arrangement comprises a rider roll designated altogether as 100 which contains a multitude of weighting roller pairs 2,2' only one of which is shown on the right side of FIG. 1 by the weighting roller designated altogether as 2, which is mounted to a bracket designated altogether as 10. For the weighting roller 2' shown on the left in FIG. 1, the components that serve to guide the roller tube 8 are omitted for clarity.

In order to obtain a rider roll 100, a multitude of weighting rollers, or weighting roller pairs 2,2' are mounted to a support beam 1 next to each other and by means of brackets 10. The paired arrangement of the weighting rollers 2,2' to a common bracket 10 corresponds to an arrangement having an optimal number of weighting rollers 2,2' per meter of roll width. It is possible, e.g., to use 16 weighting rollers per meter of roll width.

Since it is possible to exchange a bracket 10 from the support beam 1 rapidly and simply, individually mounted weighting rollers can also be used along the weighting roll, e.g., in a case where, based on the winding task, a second weighting roller is not required, e.g., at the gap between two windings. It is self-evident that the support beam 1 can be moved with respect to a winding 29 (only one winding is shown schematically), with dependence on its winding diameter, in order to hold the weighting roll in contact with the winding 29 along a line of contact N (nip line), as the diameter of the winding grows. Representations of the winding machine used and support or carrier rolls used in order to support the winding have been omitted since these are all conventionally known.

In the following, the assembly of the rider roll arrangement is explained with reference to the weighting roller 2 shown on the right in FIG. 1 and in FIG. 2. Pressure must be applied to each weighting roller 2 during the winding of a winding 29 in order to apply a defined linear pressure on each individual winding or on the material web to be wound thereupon, as is known in detail from U.S. Pat. No. 5,320,299. The support beam and, therefore, the entire weighting roll are moved, on one hand, with dependence on the diameter of the winding; on the other hand, the weighting rollers 2 must be able to give way individually to slight differences in the height or diameter of the winding 29. The weighting roller 2 is movable to a limited degree relative to a center axis M, the distance of which from the support beam 1 is fixed. This ability to move is achieved by means of a cylinder 3 of a piston/cylinder unit 4. The cylinder 3 has an H-shaped cross section and is fastened laterally, in a fixed manner, to the carrier bracket 10.

In order to form a weighting roller pair as a component of the rider roll 100, it is preferable to arrange, symmetrical to the cylinder 3, a cylinder 3' of an additional weighting roller 2' on the opposite side of the bracket 10. In order to press the weighting roller 2,2' against the winding 29, represented by means of a dashed line, the cylinder chamber 5 that faces this winding is hydraulically loaded. In order to lift or counterbalance each individual weighting roller 2,2', the cylinder chamber 6 that faces away from the winding 29 is loaded with the use of pneumatic pressure. Two linear guides 7, shown in FIG. 2, e.g., element pairs composed of a ball-bearing guide 25 and rod 26 serve as an axial guide for the weighting rollers 2,2' relative to the cylinder axis Z, with the ball-bearing guide 25 being able to be mounted on the central plate 30 of the bracket 10 on both sides of the longitudinal sides of the cylinder 3,3'.

Each weighting roller 2,2' features a roller tube 8, within which are arranged the piston/cylinder unit 4 as well as the elements serving to guide the weighting rollers. In order for the weighting rollers to be able to rotate along with the winding 29, the roller tube 8 is supported about a support 11, in a pivoted manner, by means of ball bearings 9. The ball bearings 9 are held by means of a support 11 in the form of a double chamber, which simultaneously carries the fluid pistons 12 and pneumatic pistons 13. The movement of the weighting rollers 2 about the cylinder 3 is guided by means of the linear guides 7 and is made possible by means of two rolling diaphragms 14, 15, which close off the cylinder chamber 5 and piston 12, or cylinder chamber 6 and piston 13 respectively, in a sealing manner. The supports 11 form, with the ball bearings 9 and the pistons 12, 13, a unit for which the distance of the individual weighting rollers 2,2' from the surface of the winding 29 (nip line N) can hence be varied.

The mounting of the diaphragms between the aforementioned unit and cylinder is explained, per example, for the "pneumatic side". The end of the cylinder 3,3' features an annular peripheral recess 17, against which is mounted, in a sealing manner, a rolling membrane 15, by means of an annular collar 18 fixed with a screw connection designated altogether as 19. In order to form a piston seal, the rolling membrane 15 is mounted between piston 13 and support 11, e.g., by means of screwing. A disk spring package 16 is provided on the hydraulic side 5, 12, 14, between the support 11 and hydraulic piston 12 including rolling membrane 14, such that the membrane 14 is inserted between the piston 12 and a counterpart 24 by means of a screw connection, with the disk spring package 16 coming into effect between the support 11 and the counterpart 24.

Figure 2:
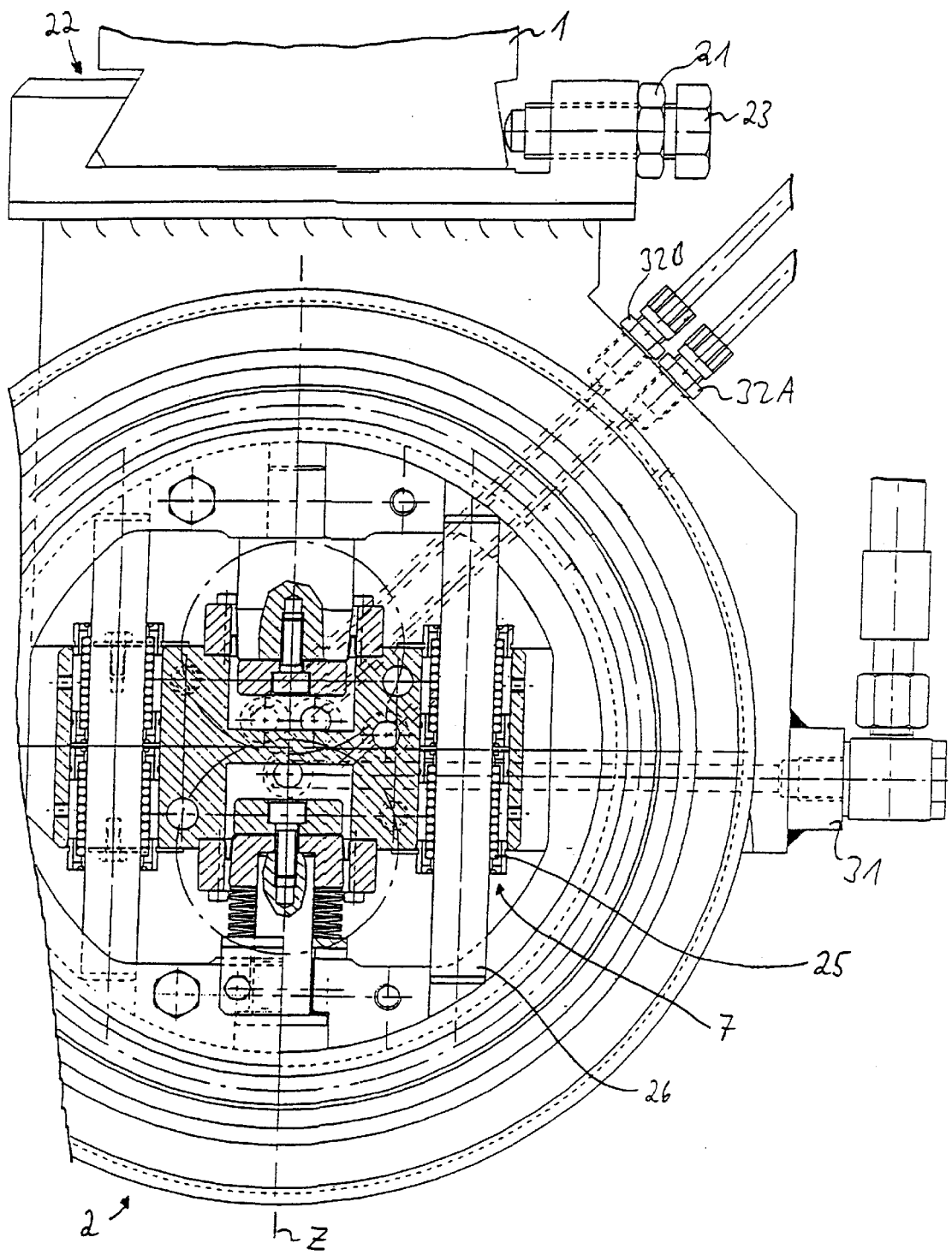

Therefore, the position of the weighting roller 2 shown in FIGS. 1 and 2 corresponds to a center position between a fully lowered weighting roller (piston 13 rests against the cylinder wall of the cylinder chamber 6) and a fully lifted position (cylinder 12 rests against the end wall of the cylinder chamber 5). A shock absorber in the form of said disk spring package 16, which is arranged on the hydraulic side between the piston 12 and the support 11, serves to protect the rolling membranes 14, 15 against over-stress. The disk spring package 16 is used to intercept, "internally", a suddenly occurring change in pressure or pressure peak in the cylinder chamber 5, i.e., on the hydraulic side.

A fact also serving to simplify the construction and control of the overall rider roll is that the cylinder chamber 5 is connected to the cylinder chamber 5' of the second weighting roller 2' of the weighting roller pair 100 as shown, e.g., by means of a channel 20 that reaches through the cylinders 3, 3' and central plate 30 of the bracket 10. It is preferable for the central plate 30 to also support the hydraulic supply 31 as well as the pneumatic supplies 32a, 32b. The channels for feeding hydraulic fluid or pneumatic fluid are guided in a suitable manner within the central plate 30, as indicated by a dashed line in FIG. 2. This also simplifies, in particular, an exchange of a weighting roller pair of a weighting roll 100, since for a defect or during maintenance of a weighting roller 2 or both weighting rollers 2, 2', only the supplies 31, 32a, 32b and the mounting means 21 of a quick-acting closure must be detached.

For this purpose, the quick-acting closure 22, for a dovetail-type support beam 1 functioning as shown as a rail, can form the counterpart that is guided in the rail and clamped by means of one or several screws 23.

The use, altogether, of a closed hydraulic control loop is preferred such that even for minor movement of individual weighting rollers, a uniform load distribution can be achieved on all weighting rollers. Any suitable lubricating and/or hydraulic oil can be used as hydraulic fluid, while the use of air is preferred as pneumatic fluid.

Since the distance from each of the weighting roll pairs on the support beam is infinitely adjustable, it is also possible to arrange weighting roller pairs having different tube widths on one carrier or to distribute the same over the machine width. Both the distance between two windings as well as the distribution of the weighting rollers over the winding width can be selected by this means to be extremely flexible and to be adapted to the winding task.

With a rider roll arrangement in accordance with the invention, it is possible to weight the windings in a programmed, fully automatic manner, with dependence on the respective winding diameter. In order to lift the weighting rollers in the region of the narrow clearance gap between adjacent material webs, it is sufficient to actuate valves in order to control the pneumatic fluid, thereby pressurizing the cylinder chamber 6 of the piston/cylinder.

| List of reference numbers | |
|---|---|
| 1 | Support beam |
| 2 | Weighting roller |
| 3 | Cylinder |
| 4 | Cylinder/piston unit |
| 5 | Cylinder chamber |
| 6 | Cylinder chamber |
| 7 | Linear guide |
| 8 | Roller tube |
| 9 | Ball bearings |
| 10 | Bracket |
| 11 | Support |
| 12 | Fluid piston |
| 13 | Pneumatic piston |
| 14 | Rolling membranes |
| 15 | Rolling membranes |
| 16 | Disk spring package |
| 17 | Recess |
| 18 | Annular collar |
| 19 | Screw connection |
| 20 | Channel |
| 21 | Mounting means |
| 22 | Quick-acting closure |
| 23 | Screw |
| 24 | Counterpart |
| 25 | Ball-bearing guide |
| 26 | Rod |
| 29 | Winding |
| 30 | Central plate |
| 31 | Hydraulic supply |
| 32a, 32b | Pneumatic supply |
| 100 | Rider roll |
| Z | Cylinder axis |
| M | Center axis |
| N | Nip line |

What is claimed is:

1. A rider roll arrangement adapted for use in a web winding device including at least one winding supported during winding, said rider roll arrangement including a rider roll for pressing against the one winding, said rider roll comprising a support beam and a plurality of weighting rollers mounted to said support beam, each of said weighting rollers including support means for mounting the roller on the support beam, and means located entirely radially inwardly within said roller for moving the roller relative to said support means.

2. A rider roll arrangement in accordance with claim 1 wherein said means for moving the roller relative to said support beam further comprises a linear guide located entirely radially inwardly within said roller.

3. A rider roll arrangement in accordance with claim 1 wherein said means for moving the roller relative to said support means comprises two end to end cylinder piston units that are connected to said means for mounting the roller on the support beam and that are located entirely within said roller.

4. A rider roll arrangement in accordance with claim 3 wherein said roller includes a roller tube, and wherein said rider roll arrangement further includes mounting means for mounting the roller on the means for moving the roller relative to said support beam, said mounting means comprising ball bearings located between the outer ends of said cylinder piston units and said roller tube.

5. A rider roll arrangement in accordance with claim 3 wherein one cylinder piston unit is hydraulic and the other cylinder piston unit is pneumatic, with said hydraulic cylinder piston unit facing toward the winding and the pneumatic cylinder piston unit facing away from the winding.

6. A rider roll arrangement in accordance with claim 5 wherein said hydraulic cylinder piston unit includes a shock absorber to act as a protection against over stress.

7. A rider roll arrangement in accordance with claim 1 wherein said support means for mounting the roller on said support beam comprises a bracket.

8. A rider roll arrangement in accordance with claim 7 wherein a pair of said weighting rollers are mounted on said bracket, with one of said weighting rollers being mounted on one side of said bracket, and the other of said weighting rollers being mounted on the other side of said bracket.

9. A rider roll arrangement in accordance with claim 8 wherein said means for moving each of the rollers relative to said bracket comprises each of said rollers including two end to end cylinder piston units that are connected to said bracket and that are located entirely within said respective roller.

10. A rider roll arrangement in accordance with claim 9 wherein one cylinder piston unit is hydraulic and the other cylinder piston unit is pneumatic, with said hydraulic cylinder piston unit facing toward the winding and the pneumatic cylinder piston unit facing away from the winding.

11. A rider roll arrangement in accordance with claim 10 wherein said hydraulic cylinder piston unit of each of said rollers in said pair are in hydraulic communication with each other.

12. A rider roll arrangement in accordance with claim 10 wherein said pneumatic cylinder piston unit of each of said rollers in said pair are in pneumatic communication with each other.

13. A rider roll arrangement in accordance with claim 10 wherein said hydraulic cylinder piston unit includes a shock absorber to act as a protection against over stress.

14. A rider roll arrangement in accordance with claim 7 wherein said bracket is mounted to the support beam by means of a quick acting closure.

* * * * *